Figure 3:
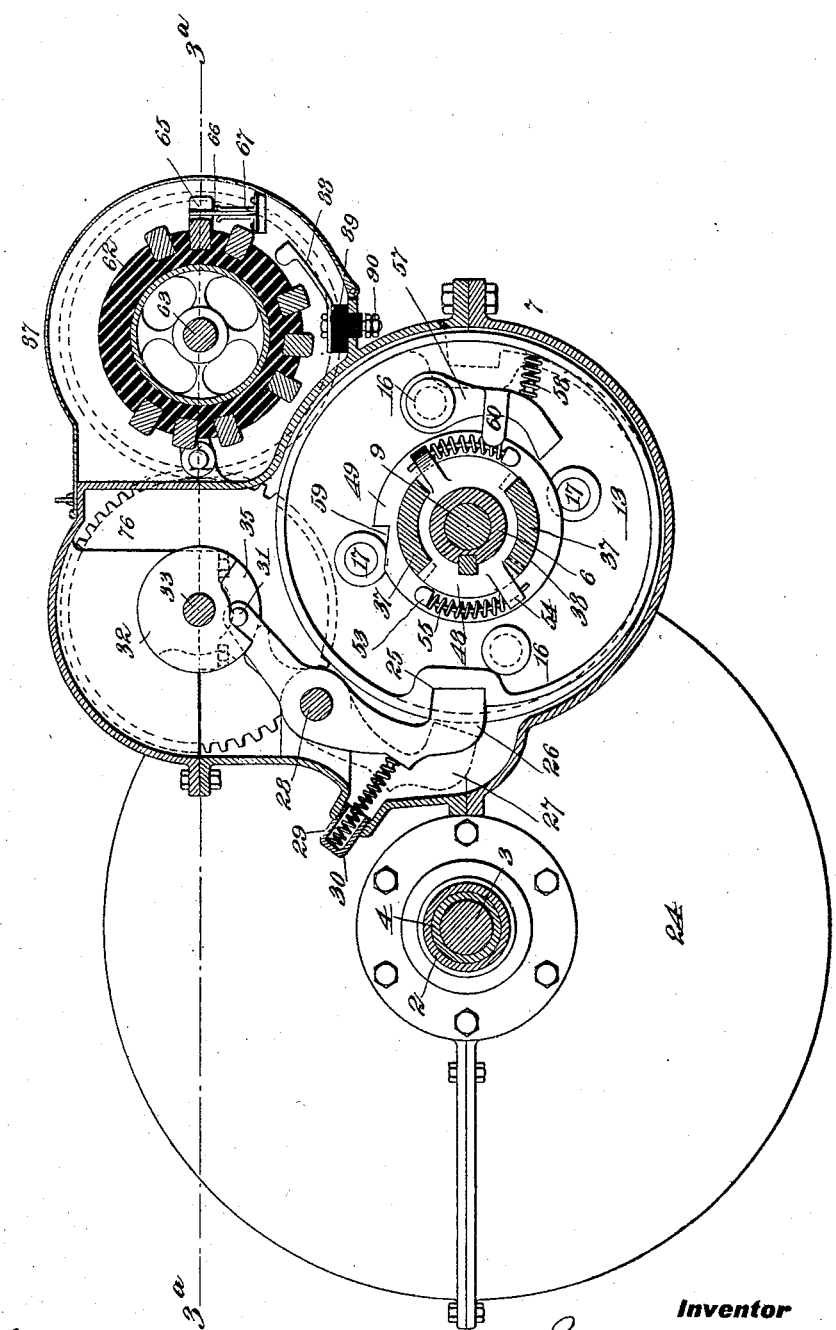

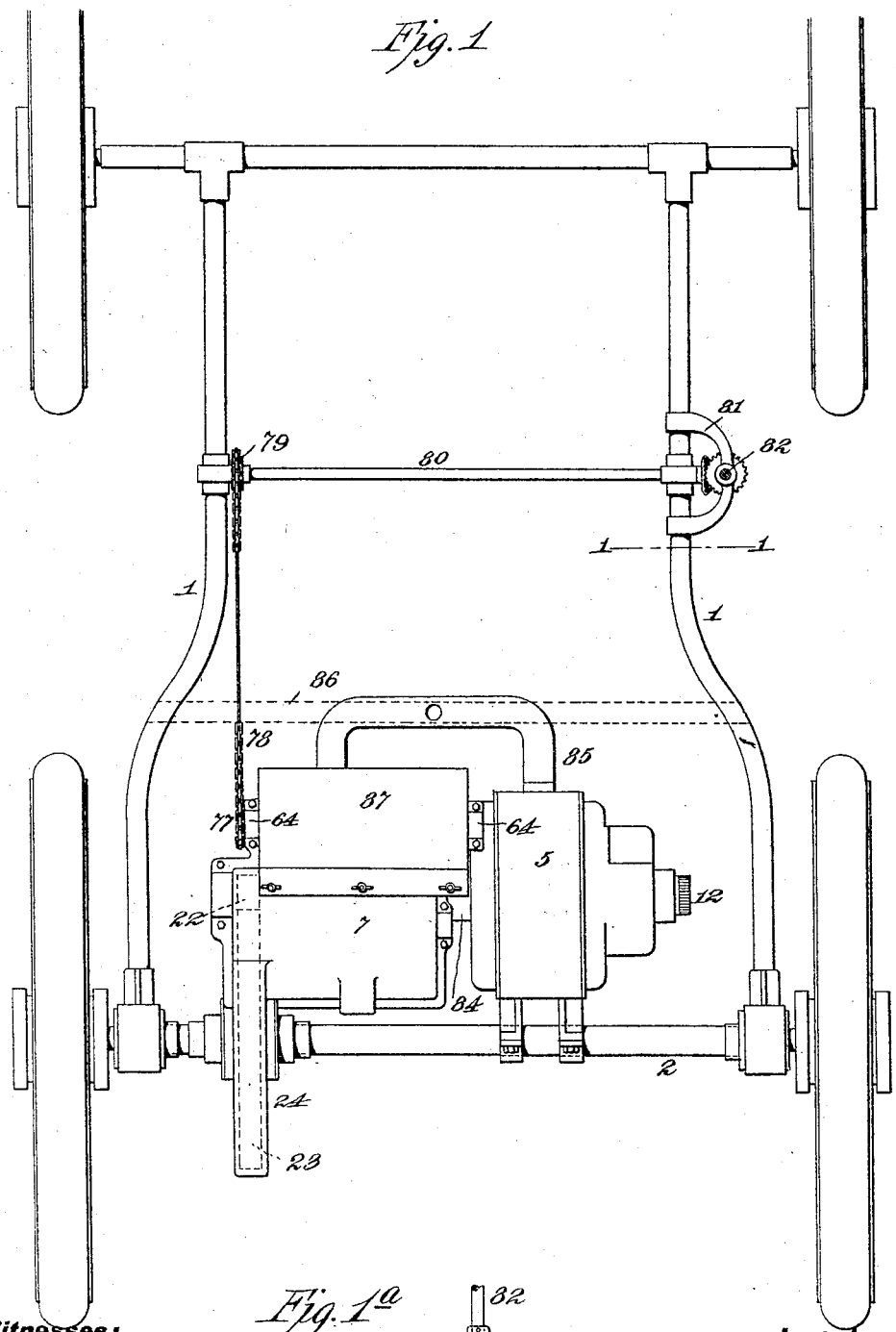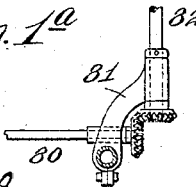

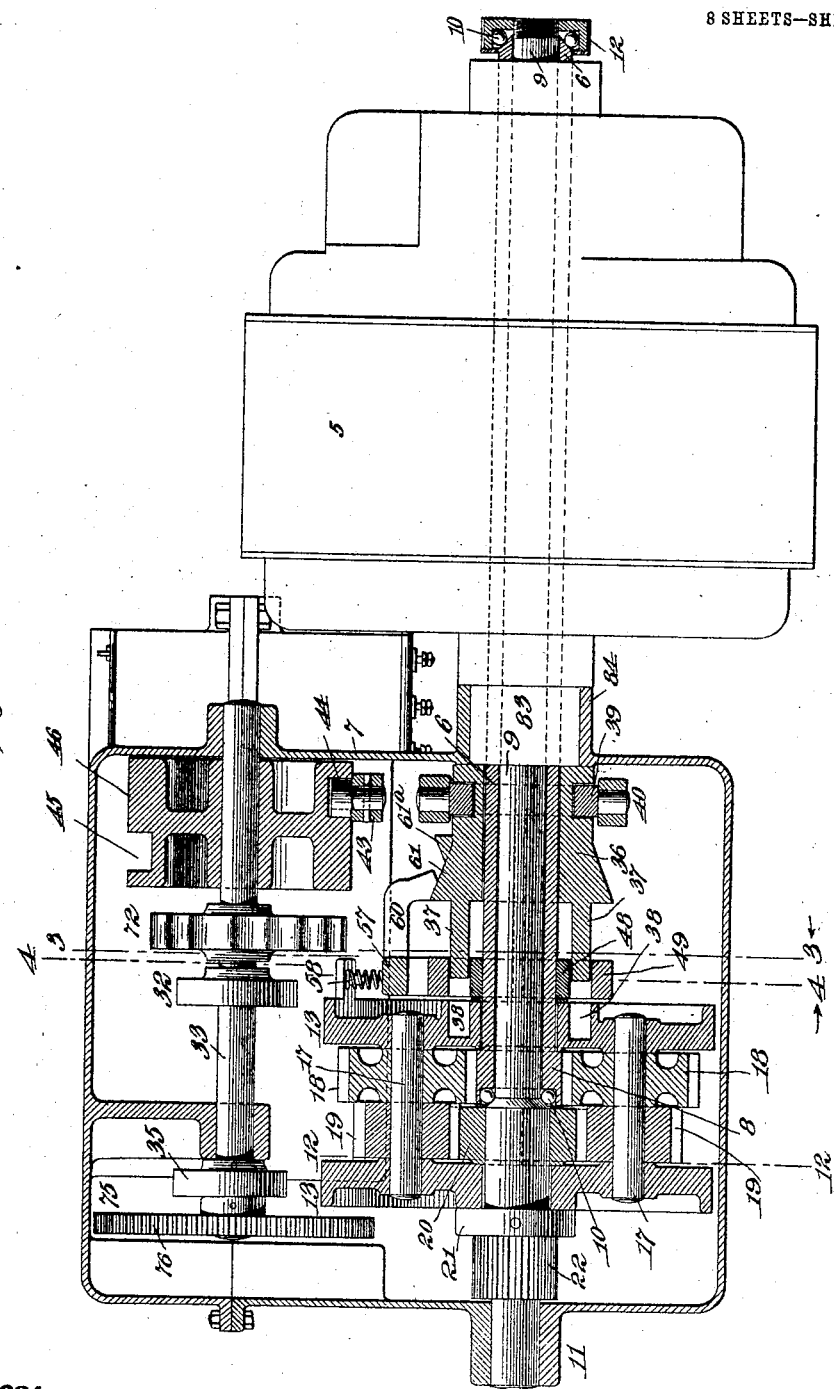

No. 796,828. PATENTED AUG. 8, 1905.
F. L. DYER.
VARIABLE SPEED GEARING.
APPLICATION FILED FEB. 24, 1902.

8 SHEETS—SHEET 3.

Witnesses:
Jas F Coleman
Jno. Robt Taylor

Inventor
Frank L. Dyer
by Dyer Edmonds & Dyer
Attorneys

No. 796,828. PATENTED AUG. 8, 1905.
F. L. DYER.
VARIABLE SPEED GEARING.
APPLICATION FILED FEB. 24, 1902.
8 SHEETS—SHEET 4.
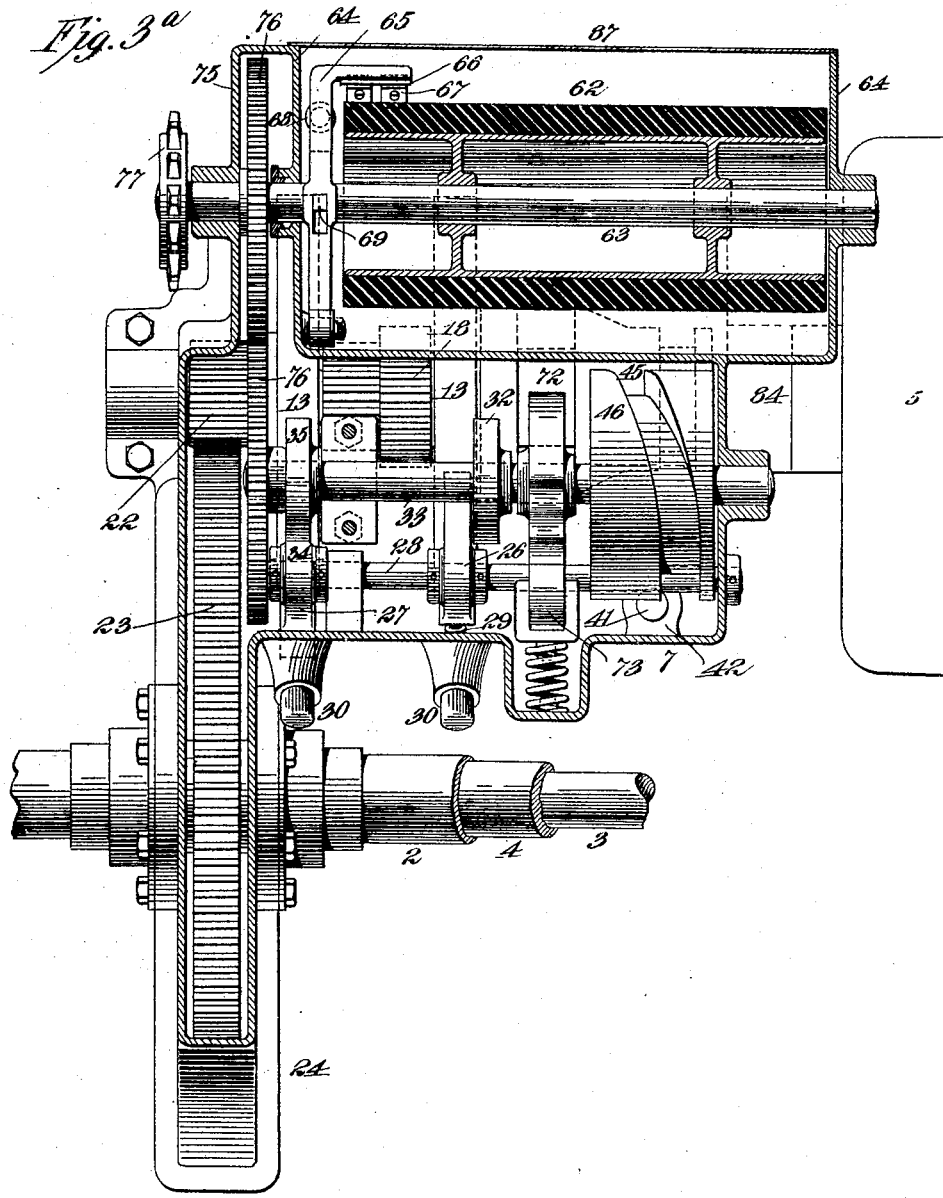
Fig. 3ª
Witnesses:
Jas. F. Coleman
Jno. Robt Taylor
Inventor
Frank L. Dyer
by Dyer Edmonds & Dyer
Attorneys No. 796,828. PATENTED AUG. 8, 1905.
F. L. DYER.
VARIABLE SPEED GEARING.
APPLICATION FILED FEB. 24, 1902.
8 SHEETS—SHEET 5.
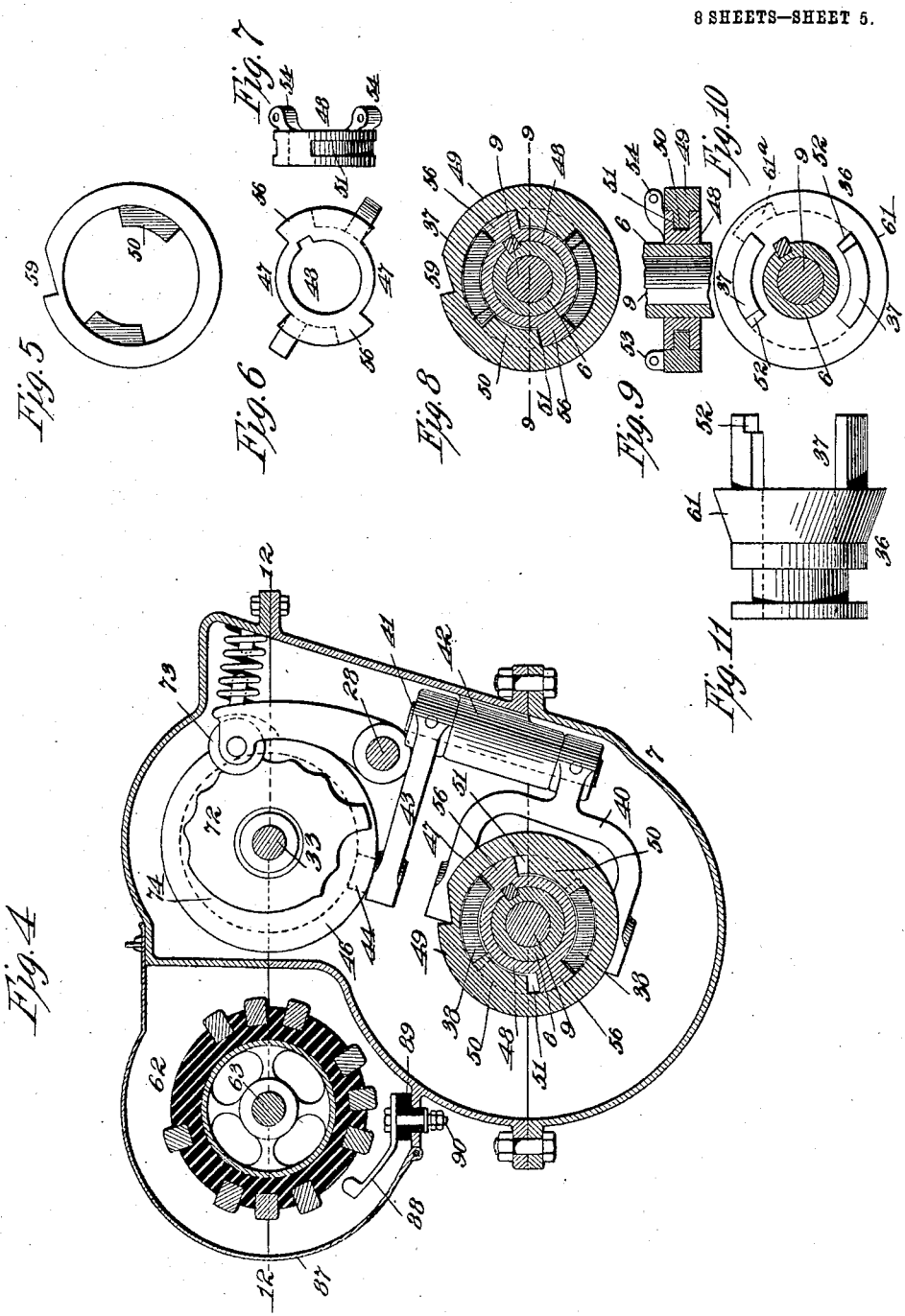
Witnesses:
Jas. F. Coleman
Jno. Robt Taylor
Inventor
Frank L. Dyer
by Dyer Edmonds & Dyer
Attorneys No. 796,828. PATENTED AUG. 8, 1905.
F. L. DYER.
VARIABLE SPEED GEARING.
APPLICATION FILED FEB. 24, 1902.
8 SHEETS—SHEET 6.
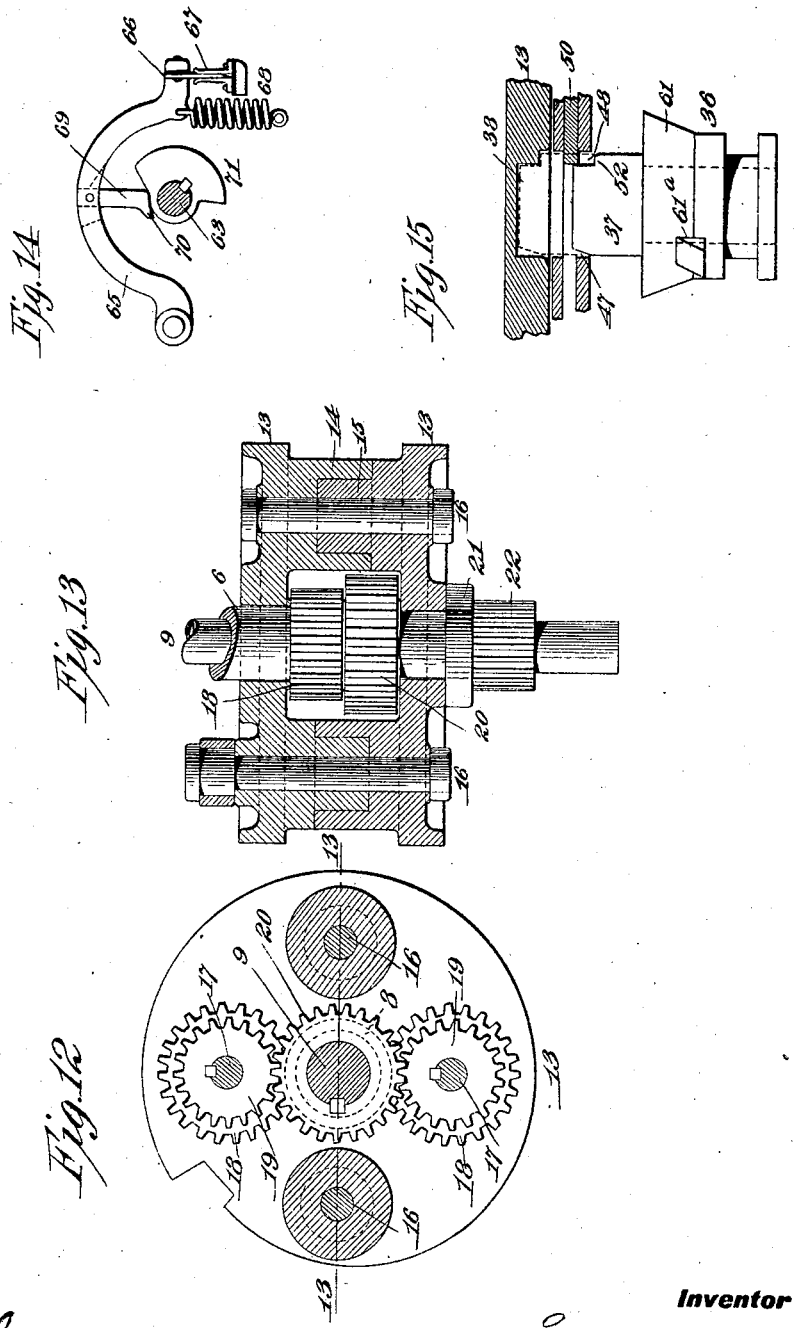
Witnesses:
Jas. F. Coleman
Jno. Robt Taylor
Inventor
Frank L. Dyer
by Dyer Edmonds & Dyer
Attorneys No. 796,828. PATENTED AUG. 8, 1905.
F. L. DYER.
VARIABLE SPEED GEARING.
APPLICATION FILED FEB. 24, 1902.
8 SHEETS—SHEET 7.
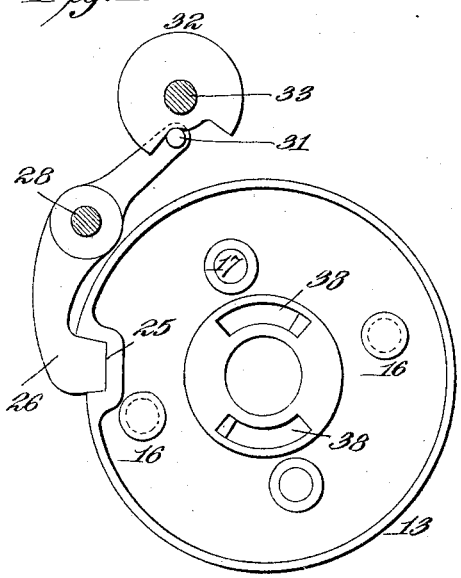
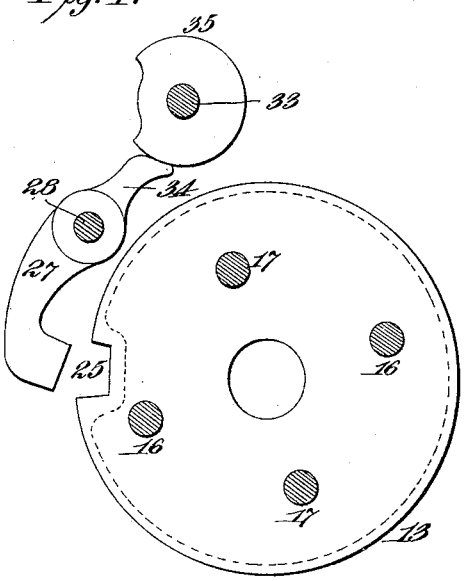
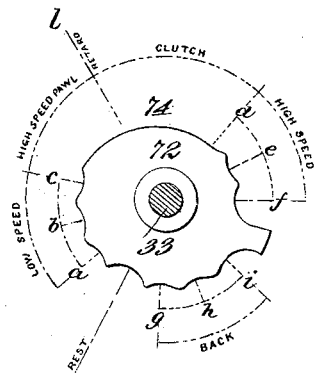
Witnesses:
Jas. F. Coleman
Jno. Robt Taylor
Inventor
Frank L. Dyer
by Dyer Edmonds & Dyer
Attorneys

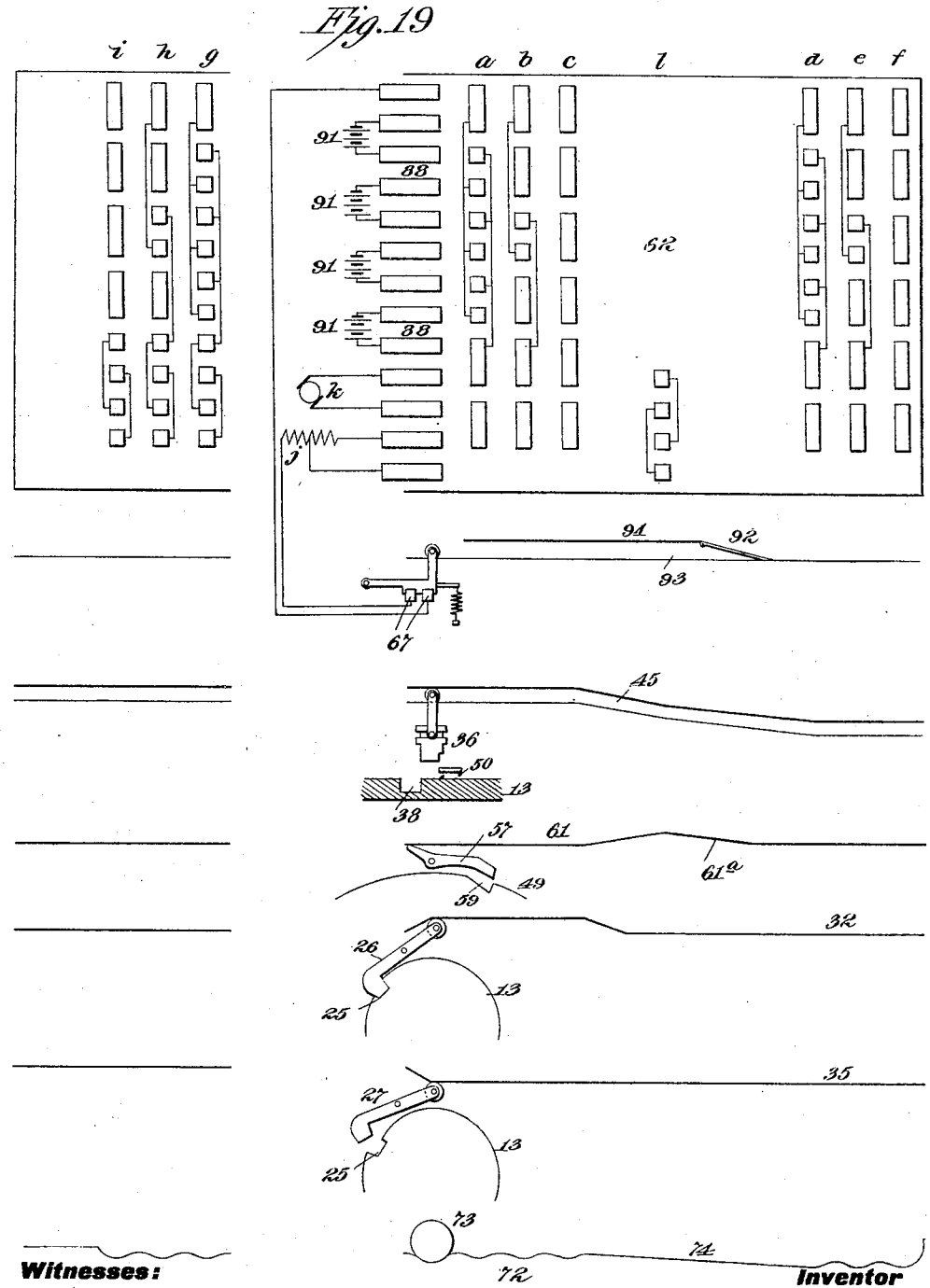

UNITED STATES PATENT OFFICE.

FRANK L. DYER, OF MONTCLAIR, NEW JERSEY, ASSIGNOR OF ONE-HALF TO RICHARD N. DYER, OF EAST ORANGE, NEW JERSEY.

VARIABLE-SPEED GEARING.

No. 796,828.        Specification of Letters Patent.        Patented Aug. 8, 1905.

Application filed February 24, 1902. Serial No. 95,171.

*To all whom it may concern:*

Be it known that I, FRANK L. DYER, a citizen of the United States, residing at Montclair, in the county of Essex and State of New Jersey, have invented a certain new and useful Improvement in Variable-Speed Gearings, of which the following is a specification.

The purpose of my invention is to produce a variable-speed gearing in which changes in speed relation between the motor and the load can be produced by simple and effective means and without shock even when jaw-clutches or similar positively-acting devices are employed to couple the parts in their different relations, and even when the change in the speed relation is considerable for a single adjustment.

In carrying out my invention I combine and coördinate the adjusting or shifting devices of the gearing with the means for stopping, starting, and varying the speed of the motor or engine in such manner that in shifting from one speed relation to another (either higher or lower) the motor and load are disconnected, and while that condition is maintained their speed relation is changed to the desired new speed relation, when the gearing can be coupled without shock to preserve this newly-established speed relation. I propose, further, to insure the recoupling of the gearing only when the parts have been brought into sychronism by having this recoupling produced automatically by the movement of the parts themselves or having it prevented by the mechanism until synchronism is attained, when it will be produced by hand, or both methods can be employed in the same gearing. Since I propose to utilize both speed variations of the motor and the momentum of the load in accomplishing these results, the invention is particularly applicable to uses where the momentum of the driven machine is great relative to the work it performs, (such as automobiles, printing-presses, and the like,) so that when the motor and load are disconnected in shifting the gear the load will continue to move, for a short time at least, by its own momentum, and since I propose to bring the parts into synchronism principally by accelerating and retarding the speed of the motor the invention is most useful when the motor is light and has a high speed compared with the load, as in the instances noted.

Assuming, for illustration, that the variable-speed gearing is one having two steps or speed adjustments, one giving three times the speed of the other, and omitting for simplicity of explanation the constant speed reduction which may be employed, if the motor has a normal speed of three hundred revolutions per minute the load will have a speed of three hundred revolutions at the high-speed adjustment of the gearing, and a speed of one hundred revolutions at the low-speed adjustment. If the load is being driven at the low-speed adjustment—viz., motor three hundred revolutions and load one hundred revolutions—and the motor and load are disconnected to shift the gearing to high speed, it will be necessary to change the relative speeds of the motor and load so as to bring them to the same speed in order to bring the parts of the gearing into synchronism for recoupling without shock at the high-speed adjustment. If the speed of the load is maintained by its momentum at one hundred revolutions, synchronism can be attained by reducing the speed of the motor to one hundred revolutions; but since the load may be considered as losing somewhat in speed even in the short time required to shift the gearing provision should be made to produce a rapid reduction in the speed of the motor toward the point of actual stoppage, so as to certainly reach and preferably cross the speed of the load. This reduction in speed of the motor may be made by withdrawing the power and allowing the motor to run down on its own friction or on a suitable auxiliary load as a friction-brake or against a back pressure, or the motor may be converted into a generator of energy or the like, such as may be best suited to the form of motor employed. For an electric motor I prefer to change the connections of the motor so as to convert it into a generator driven by its own momentum and acting on a local circuit, with the result of producing a rapid retardation of its speed, which will, if necessary, bring the motor to rest. The instant the speed of the motor is reduced to that of the main load the gearing will be recoupled for the high-speed adjustment, the motor will be relieved of the auxiliary retarding-load, and the power will be turned on to the motor, causing it to again drive the main load and to gradually accelerate the speed of the main load until the normal speed of the motor is reached. The motor and load will then be running at a speed of three hundred revolutions. Now if they are disconnected to shift the gearing to low speed, and if we assume the load maintains a speed of three hundred revolutions by its momentum, it will evidently be necessary to increase the speed of the motor to nine hundred revolutions to bring the parts of the gearing into synchronism for recoupling without shock at the low-speed adjustment, and this may be done if the conditions of use make it desirable or necessary. Since in most cases, however, the load will gradually or rapidly drop in speed toward the lower speed, it is only necessary to maintain the speed of the motor or to permit it to accelerate so much as it naturally will on the withdrawal of the load, or the speed of the motor may be actually decreased so long as it is kept running with power. As soon as the motor and load reach the desired new speed relation—*i. e.*, three revolutions of the motor to one of the load— the parts of the gearing which are to be coupled for the low-speed adjustment can be coupled without shock, when the motor will begin to drive the load, and the motor, if accelerated, being gradually reduced to normal speed, the motor and load will coincidently assume the normal low-speed conditions—viz., motor, three hundred; load, one hundred. This principle of operation can be applied to variable-speed gearings of various kinds and with more than two steps or speed adjustments, although I have invented a preferred form of gearing, which will be presently referred to. In the case of high-speed motors a constant speed reduction will be introduced between the motor and the load on either side of the variable gearing. A single operating-handle is preferably used to produce by its movement the several results already described, as well as to produce speed variations of the motor between the speed adjustments of the gearing, and thereby multiply the number of speeds at which the load may be driven.

It will be observed that with my variable-speed gearing there is no limit practically to the time which may be employed in bringing the parts to the same speed in shifting from one speed to another and that many revolutions of the shafts connected by the gearing may be utilized in doing this, whereas with positive variable-speed gearings in which the gears are carried from one to another speed by eccentric gears or by obliquely-shifting split gears the change must take place in a fraction of a revolution, with a correspondingly great shock, and necessitating a number of speed-steps with small differences between steps to accomplish the same change of speed which can be secured without shock at a single step with my gearing. The preferred form of my variable-speed gearing is also superior to variable-speed gearings employing frictional power-transmitting devices—such as belts, friction-clutches, and other frictionally-engaged surfaces—for the reason that with the latter devices a considerable loss of power takes place in the transmission, and owing to wear between the frictional surfaces frequent adjustment of the parts must be made, so that the devices in consequence are unreliable for actual use. The preferred form of my variable-speed gearing is also superior to variable-speed gearings of the type wherein spur-gears are engaged and disengaged by longitudinal movements, for the reason that with the latter devices the variations in speed are secured always with shock and noise, the gear-teeth become rapidly worn and frequently broken, and the gears must be made to engage loosely, so that the transmission is accompanied by loss of power and much noise. Obviously, however, the broad features of my invention could be utilized to advantage with either of the last two-mentioned types of gearing as well as with any type of variable-speed gearing in which the motor and load are disconnected in shifting from one speed to another. The preferred form of my variable-speed gearing possesses the advantage of enabling the variations in speed to take place as gradually as the variations in speed which are secured by the employment of frictional engaging surfaces, but without the disadvantages incident to the latter devices. It also enables the gears to be cut and fitted accurately, as is the case with variable-speed devices employing eccentric gears or split gears to effect the change from one speed to another, but without the disadvantages incident to the latter devices, and it finally enables the transmission of power to be made at any speed by direct transmission, as is the case with variable-speed devices employing longitudinally-shifting gears, but without the disadvantages incident to the latter devices above referred to. My improved variable-speed gearing, in other words, possesses the advantages and obviates the disadvantages of the prior devices for the purpose with which I am familiar.

The invention is illustrated in the accompanying drawings as applied to an electric motor driving an automobile and supplied by a storage battery.

Figure 1 is a plan view of an automobile running-gear of common form, illustrating the variable-speed mechanism as being interposed between the motor-armature and the main spur-gear on the rear axle; Fig. 1$^a$, a section on the line 1 1 of Fig. 1, showing the support for the controlling-handle shaft; Fig. 2, a sectional view through the armature-shaft and cam-shaft of the gearing, illustrating the motor in elevation; Fig. 3, a section on the line 3 3 of Fig. 2, looking toward the abutment of the gearing; Fig. 3$^a$, a section on the line 3$^a$ 3$^a$ of Fig. 3, taken through the cam-shaft and controller-shaft; Fig. 4, a section on the line 4 4 of Fig. 2 looking toward the clutch; Fig.

5, a separate elevation of the locking-ring for the clutch; Fig. 6, an elevation of the supporting-disk for the locking-ring; Fig. 7, a side view of the same; Fig. 8, a cross-sectional view through the locking-ring and its supporting-disk; Fig. 9, a section on the line 9 9 of Fig. 8; Fig. 10, a front view of the movable clutch member; Fig. 11, a side view of the same; Fig. 12, a section on the line 12 12 of Fig. 2; Fig. 13, a section on the line 13 13 of Fig. 12, illustrating the preferred construction of the abutment; Fig. 14, a detailed elevation of the mechanically-operated switch; Fig. 15, a detail view illustrating the coöperation between the movable clutch member and the abutment; Fig. 16, a separate detail view showing the abutment, the forward low-speed dog, and the cam for the same; Fig. 17, a corresponding view showing the abutment, the backward low-speed locking-dog, and its cam; Fig. 18, a side view of the star-wheel; and Fig. 19, a diagram of the circuits, showing also diagrammatic views of the mechanical devices which are coördinated with the controller.

In all of the views corresponding parts are represented by the same letters and numerals of reference.

The automobile running-gear shown in Fig. 1, which I have selected for the purpose of illustration, is of a well-known type, the front and rear axles being connected by reach-bars 1 and the rear axle being mounted in a tube 2. The rear axle is formed of a shaft 3, connected with one wheel and of a tube 4, connected with the other wheel, (see Figs. 3 and 3ª,) and the shaft 3 and tube 4 are connected together by a differential gear located in the hub of one of the rear wheels. A motor 5 of any suitable type is clamped to the tube 2, the latter being capable of rotary movement with respect to the reach-bars 1. The armature-shaft 6 of the motor 5 is tubular and extends within a casing 7, in which are located the variable-speed gears and the mechanism for controlling and operating the same. At its end the tubular armature-shaft 6 is provided with a pinion 8, which may be cut thereon. Mounted within the armature-shaft is a driven shaft 9, supported on balls 10 10 at each end of the armature-shaft, as shown. The driven shaft 9 is also supported by a bearing 11 in the casing 7. The cup 12 for one of the sets of balls 10 can be turned to move the armature-shaft 6 longitudinally with respect to the driven shaft 9, so as to simultaneously adjust both sets of bearings, as will be understood.

Mounted on the armature-shaft and driven shaft, respectively, are two disks 13, which considered collectively constitute an abutment in which the speed-reducing gears are carried. Each of these disks is formed with a socket 14 and a projection 15, which interlock, after which the disks are held together by bolts 16, so as to form a rigid strong abutment. (See Fig. 13.) Mounted in the abutment-disks 13 are shafts 17, to which are keyed spur-gears 18, which mesh with the pinion 8 on the armature-shaft 6. The shafts 17 also carry pinions 19, which mesh with a spur-gear 20, keyed to the driven shaft 9. The relation between the pinions 8 and 20 and the gears 18 and 19 can be varied to secure any desired speed reduction between the armature-shaft 6 and the driven shaft 9. The relation illustrated provides for a reduction of from one to three, the armature-shaft making three turns for each turn of the driven shaft. The driven shaft 9 is provided with a collar 21, which bears against the adjacent abutment-disk 13, and beyond said collar it is provided with a pinion 22, which engages and drives a spur-gear 23, keyed to the tubular part 4 of the rear axle, and which is inclosed in a casing 24, to which the tube 2 is connected, said casing being a part of the casing 7 of the gearing. Each abutment-disk 13 is formed with a notch 25 in its periphery, each notch being higher on one side than on the other and the notch of one disk being oppositely arranged with respect to the notch of the other disk, as shown in full and dotted lines, Fig. 3. (See also Figs. 16 and 17.)

Coöperating with one of the abutment-disks is a forward low-speed locking-dog 26 and with the other disk a backward speed-dog 27. These dogs are pivoted on a shaft 28, carried by the casing 7, and when released are forced into engagement with the abutment-disks by springs 29, carried in movable caps 30, so that said springs can be readily removed and replaced. It will be observed that when one or the other of the dogs is in engagement with its respective abutment-disk the disk if turning in one direction will not be locked by the dog, because the dog will ride off of the high side of the notch 25, so as to jump the same; but if the disk is turning in the opposite direction the dog will strike the high side of the notch 25 and fully enter the same, so as to lock the abutment from movement in either direction. Since the notches 25 are oppositely disposed, it becomes possible to lock the abutment from rotation by one or the other of the locking-dogs when the abutment tends to rotate in either direction, so that the device can be used for driving the load in either direction, as will be explained. The forward dog 26 is provided with a tail-pin 31, which is engaged by a cam 32 of proper shape on a cam-shaft 33. The tail 34 of the other dog is engaged by a cam 35 of proper shape on said cam-shaft. The cam 35 is so formed (in the specific embodiment of the invention illustrated) as to permit the backward dog 27 to engage its respective abutment-disk only when the controlling mechanism is moved to effect a backward rotation of the armature-shaft. At all other times the backward dog is elevated. The cam 32 is so formed as to maintain the forward low-speed dog 26 in an elevated position at all times except during the forward movement at the low-speed adjustment of the gearing. The cam-shaft 33 is mounted in bearings carried by the casing 7, as shown.

Splined to the shaft 6 so as to be movable thereon is a movable clutch member 36, having in the instance shown two jaws 37, which are adapted to engage two recesses 38 in the adjacent abutment-disk 13. The sliding clutch member 36 is provided with a ring 39, to which a fork 40 is pivotally connected. The fork 40 is secured to a rock-shaft 41, mounted in a bearing 42, carried by the casting 7 and having an arm 43 keyed to its upper end, which arm is provided at its extremity with a roller 44, coöperating with a cam-groove 45 in a cylinder 46, keyed to the cam-shaft 33. The cam-groove 45 is so formed as to swing the arm 43 to thereby move the sliding clutch member 36 toward or from the abutment when a change in the speed relation between the armature-shaft and driven shaft is to be effected and to hold the jaws 37 in or out of engagement with the recesses 38 during any further movements of the cam-shaft on either side of the clutch-shifting position thereof to effect variations in speed of the motor by the motor-controlling devices.

The jaws 37 of the sliding clutch member pass through recesses 47 in a disk 48, which is keyed to the armature-shaft 6. Surrounding the disk 48 and also the clutch-jaws 37 is a ring 49, having a pair of wings 50, Figs. 5 and 9, which work in recesses 51 in the disk 48, Fig. 9. Each of the jaws 37 is formed with a shoulder 52, adapted to be brought into engagement with the wings 50, so as to prevent the jaws 37 from entering the recesses 38 until the ring 49 is slightly turned with respect to the disk 48 to withdraw the wings 50 from engagement with the shoulders 52. The ring 49 is provided with a pair of ears 53 and the disk 48 is provided with ears 54, and mounted between each pair of ears 53 and 54 is a spring 55, tending to normally engage the wings 50 with the jaws 37, so that when the jaws are moved toward the abutment the shoulders 52 will engage said wings. When the ring 49 is partially rotated with respect to the disk 48 to disengage the wings 50 from the shoulders 52 to thereby release the sliding clutch member, the further movement of the ring will be arrested by the wings coming into engagement with the solid portions 56 of the disk 48. (See Fig. 8.) When the sliding clutch member is entirely withdrawn from engagement with the abutment, the shoulders 52 will be removed a slight distance from the wings 50, so that in moving toward the engaging position the sliding clutch member will permit the high-speed pawl to drop into engagement with the ring 49, as will be explained, before its movement is arrested by the engagement of the shoulder 52 with the wings 50.

The high-speed pawl 57 is pivoted to the abutment-disk, which carries the recesses 38, in line with the ring 49. This high-speed pawl is normally impelled toward said ring by a spring 58. The ring 49 is provided with a tooth 59, with which the high-speed pawl may engage to slightly rotate the ring to release the sliding clutch member and permit the jaws 37 to enter the recesses 38. The tooth 59 is so located on the ring 49 that when the high-speed pawl 57 has moved the ring 49 until the wings 50 engage the shoulders 56 of the disk 48 the jaws 37 of the sliding clutch member will be in line with the recesses 38 of the abutment, so as to thereby permit the said jaws to engage said recesses, and thereby to lock the armature-shaft 6 to the abutment 13.

When the abutment 13 is stationary, to provide for a low-speed relation between the armature-shaft and driven shaft the ring 49 will be turned beneath the high-speed pawl 57, so that the latter will freely ride over the tooth 59. The noise resulting from this clicking of the high-speed pawl and the wear thereon are the only objections to such an arrangement, provided, however, the motor-armature always rotates in the same direction. If, however, the abutment were stationary and the rotation of the armature were reversed, the tooth 59 would engage the high-speed pawl to hold the armature from rotation. When, therefore, provision is to be made for reversing the rotation of the driving-shaft, as in the embodiment of the invention illustrated, provision should be made to hold the high-speed pawl elevated, at least during the time the rotation of the armature is reversed and preferably also during the time that the abutment is stationary, to effect the low-speed relation in order to prevent the noise due to the movement of the tooth 59 beneath the high-speed pawl. To effect this result, therefore, I provide the high-speed pawl 57 with a finger 60, which works on a conical shoulder 61 on the sliding clutch member. When the sliding clutch member is therefore entirely withdrawn, the conical shoulder 61 will elevate the high-speed pawl to raise it from the ring 49. This will be the position which the high-speed pawl will occupy when the clutch is released and the low-speed relation between the armature and driven shafts is maintained whether the load is driven forward or backward. When, however, the movable clutch member is moved toward its engaging position and before the shoulders 52 of the jaws 37 engage the wings 50 of the ring 49, the conical shoulder 61 will permit the high-speed pawl to be moved inwardly until it engages the ring 49, so that the high-speed pawl will then be in position to perform its proper function in effecting the release of the sliding clutch member when the abutment tends to rotate at a greater speed than the latter.

If desired, the movable clutch member 36 may be provided with an inclined cam $61^a$, placed in line with the finger 60 of the high-speed pawl when the relative movement of that finger with respect to the sliding clutch member is arrested by the engagement of the high-speed pawl with the tooth 59 of the locking-ring. By this arrangement after the jaws 37 have engaged the recesses 38 of the abutment a further movement of the sliding clutch member 36 to force said jaws to their extreme limit will cause the cam $61^a$ to again elevate the high-speed pawl and keep it elevated from the locking-ring 49. By this arrangement the high-speed pawl will be relieved of any strains incident to use, as might result from a sudden acceleration of the load causing the abutment to tend to move faster than the clutch. If the high-speed pawl were not elevated, any strain produced by that movement would obviously be received upon the pawl and not upon the rear faces of the clutch-jaws. Instead of this expedient the arrangement shown in Fig. 15 may be employed. Here the rear face of each jaw 37 is rounded or inclined, as shown, and the rear face of each recess 38 is similarly curved or rounded. When, therefore, the jaws 37 are moved into the recesses 38, these rounded surfaces engaging together will effect a relative separation between the high-speed pawl and locking-ring 49, so as to relieve the former of strains.

The turning movements of the cam-shaft 33, operating the several cams for the clutch and low-speed dogs, effect the operation of the speed-changing mechanism, as will be presently described. Preferably this cam-shaft is connected with the mechanism by means of which the motor is controlled, whether in speed or in direction of rotation of its driving-shaft, or both, and in the case of an electric motor this cam-shaft is connected with the motor-controller and is coördinated therewith in such a way that the movements of the controller not only effect the control of the motor, but also properly bring about the change in the speed relation between the armature-shaft and the driven shaft, as I have before more fully pointed out. The controller-cylinder 62 is mounted on a shaft 63, carried at the side of the casing 7 and parallel with the cam-shaft 33, the controller-shaft being mounted in suitable bearings formed in extensions 64 from the casing 7. (See Fig. $3^a$.) The controller-cylinder 62 is made of insulating material and carries the contacts for controlling the motor, one arrangement of which will be explained when the electrical circuits are described.

I prefer to make use of a mechanically-operated electric switch which is connected with the controller in such a way that at the high-speed relation between the armature-shaft and the driven shaft when the armature speed has been reduced to the minimum a further movement of the controller not only puts the gearing in condition to permit a low-speed relation between the armature-shaft and driven shaft to be brought about, but also breaks the motor-circuit and keeps that circuit open until the controller has moved over the motor-tetarding contacts and preferably until it has moved back to the normal open circuit or starting position. The advantage of this arrangement will be explained when the electrical operations are described. A suitable arrangement of mechanically-operated switch for the purpose is shown in Figs. $3^a$ and 14. An arm 65 is pivoted to one of the extensions 64 immediately beyond the controller and is provided with a contact-blade 66, making contact between the springs 67, which are included in the motor-circuit. A spring 68 moves the arm to its normal position to keep this circuit closed. The arm 65 is provided with a dog 69, pivoted thereto, and said dog is provided at its lower end with a foot 70. The dog, as shown, is capable of a swinging movement in one direction only with respect to the arm 65. Secured to the controller-shaft is a cam 71, adapted to engage the dog 69 at the proper time, so that a further movement of the controller-shaft will swing the arm 65 against the tension of the spring 68 to break the motor-circuit.

When the controller-shaft reaches the position where it is again desired to complete the motor-circuit, the cam 71 passes from beneath the dog 69 to allow the spring 68 to again close the circuit between the contacts 67. On the next forward movement of the controller the cam 71 strikes the dog 69 and swings it to one side without breaking the circuit at the contacts 67. It is only when the cam 71 has moved completely below the dog 69 and is moved in the reverse direction that the switch-arm 65 is elevated. This movement, as will be explained, takes place when the controller is moving toward the normal position in order that the retarding-contacts may not check the motor in passing from high to low speed, as will be explained.

The cam-shaft 33 is provided with a star-wheel 72, with which a spring-pressed roller 73 engages. The star-wheel 72 is provided with notches in its periphery in order that the controller will be retarded at the proper points in its movement. The wheel is also provided with an inclined cam portion 74, which comes opposite the roller 73 when a change in the speed relation between the armature-shaft and the driven shaft is to be made, so that the tendency of the roller 73 to ride down the cam exerts a turning stress on the cam-shaft 33. This turning movement of the cam-shaft will be arrested, however, by reason of the locking-wings 50 engaging in front of the shoulders 52 of the clutch-jaws.

When, however, the moving clutch member is unlocked, the roller 73, riding down the cam 74 of the star-wheel, will force the jaws into engagement with the recesses 38, which movement will be augmented by the natural pressure on the operating-handle by the operator.

As before stated, the controller-shaft and cam-shaft turn in unison, which can be secured by operating both of them simultaneously from the same controlling-lever. To this end the casing 7 is cast with an auxiliary box 75, in which project the cam and controller shafts, having gears 76, which mesh together. On the controller-shaft outside of the auxiliary casing 75 is a sprocket-wheel 77, connected by a sprocket-chain 78 with a sprocket-wheel 79 on a shaft 80, mounted in bearings in the reach-bars 1. Mounted in a bracket 81 is a vertical hand-operated shaft 82, geared to the shaft 80 by a bevel-gearing, as shown. It will be obvious that by turning the shaft 82 by a suitable handle (not shown) the controller and cam shafts will be turned in unison.

In order to properly support the motor and controller, the motor, as I have before explained, is clamped to the tube 2 and the casing 7 is rigidly connected thereto by reason of the connection between the extension 23 and said tube. A cylindrical boss 83 on the motor is also received in a collar 84, formed on the casing 7, so as to rigidly connect the motor and casing together. Extending between the motor and casing is a yoke 85, elastically carried from a cross-brace 86 or from the body of the vehicle, as is common. By this arrangement the motor, gearing, and controller are all capable of a swinging movement with respect to the main spur-gear 23 in starting or when the motor is subjected to any immediate changes in load. The controller-cylinder 62 is covered by a light metal casing 87, hinged at the bottom and having a lock at its top, and contact-springs 88, which bear against the controller-cylinder, are carried on an insulating-piece 89 and connected to contact-bolts 90, from which lead the connections to the motor, the mechanically-operated switch if used, and the storage batteries or other source of supply.

Referring to Fig. 19, I illustrate diagrammatically the electrical connections which may be made, and I show also in the same way the mechanically-operated switch, the clutch, the high-speed pawl, the two low-speed dogs, and the star-wheel, all of which coöperate and are coördinated with the controller. The storage batteries 91 are illustrated as arranged in four groups and are connected to the contact-springs 88. I show three lines of forward low-speed contacts $a\ b\ c$, three lines of forward high-speed contacts $d\ e\ f$, and three lines of backing-contacts $g\ h\ i$. The contact-springs 88 are illustrated as being in the normal open-circuit position of the motor. The contacts 67 are illustrated in the armature-circuit of the motor. For the purpose of clearness the mechanically-operated switch is shown in this figure as being moved by a pivoted finger 92 from a groove 93 to a groove 94 on the rearward movement of the controller to break the circuit between the contacts 67. This breaking of the motor-circuit, it will be observed, takes place immediately after the contacts $d$ have passed beneath the contact-springs 88 on the return movement of the controller. Below the diagrammatic representation of the mechanically-operated switch I also show in the same way the movable clutch member 36 and one of the abutment-disks 13, with which the clutch member coöperates, and I have developed the cam-groove 45, so that the clutch member 36 will be moved into engaging position with the abutment while the controller moves from the contacts $c$ to the contacts $b$.

I illustrate one of the wings 50 of the ring 49 as coöperating with the movable clutch member 36, and instead of the high-speed pawl I show a stud on the abutment-disk, which engages a stud on said wing to move the wing out of engagement with the clutch member when the abutment-disk overtakes the clutch member in its rotation. Below the representation of the clutch I diagrammatically illustrate the high-speed pawl 57 coöperating with the locking-ring 49, and I show the inclined cam 61 on the movable clutch member properly developed to lift the high-speed pawl out of engagement with the locking-ring during the low-speed and reverse positions of the controller. The same figure shows the cam $61^a$ for throwing the high-speed pawl out of engagement with the locking-ring after the clutch members have been properly engaged. Below the representation of the high-speed pawl I also show the forward low-speed dog 26 with the cam 32 developed, showing that said dog will be raised from the abutment-disk 13 immediately after the lines of contacts $c$ and $a$ pass beneath the contact-springs 88 on the forward and backward movements, respectively, of the controller, said dog being again engaged with the said abutment-disk at these points on the return movements. I also show the backing-dog 27 with the cam 35 developed, illustrating the dropping of this dog immediately before the first line of backing-contacts $g$ passes beneath the springs 88. I also show the star-wheel 72 developed, showing the roller 73 engaging with the deep notch thereof corresponding with the normal open-circuit position and showing also between the lines of contacts $c\ d$ the inclined cam on the star-wheel corresponding to the movement of the clutch to lock the armature-shaft to the abutment. The motor illustrated in this view is shown as a series motor, the field-coil being designated by the letter $j$ and armature by letter $k$. Between the lines of contacts $c$ and $d$ I illustrate contacts $l$, so arranged, as will be seen, as to close the motor on a local circuit and reverse the armature connections of the motor with respect to the field and to short-circuit a part of the field, whereby the motor will operate as a generator with a reduced generating capacity, so as to give a weaker braking effect than if the motor were closed circuited on its full field. It will be observed that when the contact-springs 88 are in engagement with the line of contacts $a$ the batteries 91 will be connected in multiple with the series motor, which will be driven at its lowest speed. When the contact-springs are in engagement with the line of contacts $b$, a multiple series arrangement of the batteries with respect to the motor is secured, giving an increased speed to the motor. When the contact-springs are in engagement with the contacts $c$, the batteries will be in series with the motor, securing the maximum speed. Of course other arrangements of contacts can be employed to give a wide variation in speed changes if desired. The contacts $d$, $e$, and $f$ correspond exactly with the contacts $a$, $b$, and $c$ and provide for three changes in motor speed on the high-speed relation between the motor-armature and the driven shaft. The contacts $g$, $h$, and $i$ correspond also with the contacts $a$, $b$, and $c$, except that they are arranged to reverse the direction of the current in the armature with respect to the field, so as to cause the armature to rotate in the other direction.

Assuming the device to be constructed as I have described and to have the electrical arrangement just referred to, the operation will be as follows: When the motor is at rest, the contacts 88 will occupy a position between the contacts $a$ and $g$, the armature-circuit will be closed at the contacts 67 of the switch, the cam 32 will have been moved to drop the forward low-speed dog 26, the movable member of the clutch 36 will be withdrawn, and the high-speed pawl 57 will be elevated from the locking-ring 49. Upon moving the operating-shaft 82 forward the controller and cam shafts will move one step, throwing the roller 73 of the star-wheel out of the open-circuit position notch and allowing it to engage with the notch of the star-wheel corresponding to the contacts $a$ to connect the batteries in multiple with the motor. The motor starts to rotate, and if the low-speed dog 26 is in engagement with its abutment-disk the rotation of the armature-shaft 6 will, through the gears 8, 18, 19, and 20, drive the shaft 9 at its reduced speed, and through the gears 22 and 23 the load will be driven at the lowest speed. If, however, at the time of starting the low-speed dog 26 is not in engagement with its notch 25, the resistance of the load will cause the abutment to be turned in the direction to cause the high side of the notch to engage the dog, and the abutment will be immediately locked, this locking taking place before the abutment has moved a complete rotation, and since the motor starts from rest and at low speed no shock due to the engagement of the locking-dog with the notch will be experienced. When the controller is moved to engage the contact-springs 88 with the contacts $b$ and $c$, respectively, a proportionate increase in speed of the motor will be secured, accelerating the speed of the load through the low-speed gearing, the abutment being locked from rotation, as will be obvious. The controller can be moved forward and back from the normal open-circuit position over the contacts $a$, $b$, and $c$ without producing any change in the gearing. When the controller and cam shafts are turned farther forward to move the contacts $c$ from beneath the contact-springs, the speed relation between the motor and driven shaft will be changed. In this intermediate movement of the controller the cam-shaft will be turned to cause the cam 32 to elevate the low-speed dog 26 to thereby free the abutment and disconnect the motor from the load. The movement referred to also turns the cam 45 to move the sliding clutch member toward its locking position until the shoulders 52 engage the locking-wings 50, when further movement of the clutch toward its engaging position will be arrested. In this movement of the clutch member the conical shoulder 61 will pass beneath the arm 60 of the high-speed pawl, which will be permitted to be moved into engagement with the locking-ring 49. The roller 73 of the star-wheel also commences to ride down the cam 74 thereof, but does not entirely reach the bottom of the same, because the parts will be locked against movement by reason of the engagement of the shoulders 52 with the locking-wings 50. So far no effect has taken place except to drop the high-speed pawl and to stress the movable member of the clutch toward its engaging position. If the speed of the motor and load remained constant, the abutment would obviously remain stationary, although no power would be transmitted through the gears. Assuming that the high-speed relation between the armature-shaft and driving-shaft is three times that of the low-speed relation and that the load is moving at the same speed that was imparted to it when the motor was driving it, then in order to enable the high-speed relation to be established without shock the speed of the motor will have to be reduced to one-third. Owing to the great difference in inertia between the motor and load, the former would drop in speed very much more quickly than the latter, and this drop in speed of the motor, due to its own friction, may be relied upon to secure a sufficient retardation in motor speed to provide for the unlocking of the sliding clutch member. I prefer, however, as before stated, to bring the contacts $l$ into engagement with the contact-springs 88, so as to close the motor on a local circuit, reversing the armature-circuit of the motor with respect to the field and converting the motor into a generator of reduced generating capacity, due to the short-circuiting of a part of its field. This effects a very rapid reduction in speed of the motor without effecting a corresponding reduction in speed of the load, since the motor and load are disconnected. When the motor speed commences to fall, the abutment, which was before stationary, begins to rotate in the same direction as the armature-shaft, so that the tooth 59 of the locking-ring will continue to ride beneath the high-speed pawl. As soon, however, as the speed of the abutment equals that of the armature-shaft the abutment and locking-ring will be turning in synchronism, and when these speeds cross the high-speed pawl will overtake the locking-ring and engage the tooth 59, so as to turn the locking-ring slightly against the tension of the springs 55 and withdraw the wings 50 from the shoulders 52 of the jaws 37. This releases the sliding clutch member, and the stress on the operating-handle, together with the tendency of the roller 73 to ride down the star-wheel cam 74, will move the cam-shaft quickly to engage the clutch-jaws 37 with the recesses 38 of the abutment, thereby locking the armature-shaft and abutment together. Even if the clutch were not moved in quickly the abutment could not pass beyond the clutch, because of the engagement of the high-speed pawl with the tooth 59 of the locking-ring, and if the parts remained in this position the load would simply drive the motor ahead as a generator. As soon as the movable member of the clutch is thus released, to thereby permit the controller and cam-shafts to move forward, the contacts $l$ will be moved from beneath the contact-springs 88 and the contacts $d$ will be engaged with said springs, so as to connect the motor in multiple with the batteries on the high-speed relation. The further movements of the controller to bring the contacts $e$ and $f$ successively into engagement with the contact-springs 88 effect an increased speed of the motor without changing the speed relation between the armature and driven shafts. In the movement of the controller-shaft toward the high-speed position the cam 71 of the mechanically-operated switch trips the dog 69 without moving the arm 65 and without breaking the armature-circuit at the contacts 67. On the return movement the controller moves to bring the contacts $e$ and $d$ into engagement with the contact-springs to gradually reduce the speed of the motor on the high-speed relation of the gear, and as soon as the controller moves from the contacts $d$ toward the contacts $c$ the cam 71 will engage the dog 69 to break the motor-circuit at the contacts 67, so that although the contact-springs 88 pass over the contacts $l$ there will be no braking effect on the motor. This movement of the controller and cam-shafts also moves the cam 45 to withdraw the clutch-jaws 37 from the recesses 38, to thereby release the abutment and disconnect the motor from the load. Near the end of this movement the conical shoulder 61 will elevate the high-speed pawl. The cam 71 will hold the arm 65 elevated to keep the motor-circuit broken during the passage of the contacts $c$, $b$, and $a$ with respect to the contact-springs 88 until the controller approaches the normal open-circuit position, when the dog 69 will drop off of the cam to allow the arm 65 to be returned, causing the circuit to be again completed between the springs 67. If desired, the load and motor can then be allowed to run on their own momentum or the controller can be again started to bring the contacts $a$, $b$, and $c$ successively into line with the contact-springs 88. As the speed of the motor is thus accelerated and that of the carriage reduced, the abutment, which will be rotating in the same direction as the armature, will be gradually arrested and will stop at the exact point when the armature speed corresponds with the speed of the load at the speed reduction secured by the speed-reducing gear. In these movements the abutment will be moving forward with respect to the dog 26 to carry the high side of the notch 25 beneath the dog and causing the dog to jump said notch. As soon as the relative speeds of the armature and load tend to cross, due to further acceleration in the speed of the motor or reduction in speed of the load, or both, the abutment will start to turn backward; but the high side of the notch will immediately engage the dog 26, so that the abutment will be locked stationary, enabling the motor to drive the load through the low-speed gearing. In starting from rest to go backward the parts of the device will be in the position before explained. The first movement of the controller-shaft rearwardly elevates the low-speed forward dog 26 and drops the backing dog 27. When the contact-springs 88 reach the line of contacts $g$, the abutment will turn until the dog 27 locks it, whereupon the load will be driven in a backward direction through the gearing in the same way that it is driven in a forward direction.

As before stated, the mechanically-operated switch for breaking the motor-circuit immediately after the controller passes the line of contact $d$ on its return movement may be omitted or may be employed only to break the motor-circuit while the springs 88 are passing backward over the retarding-contacts $l$. If this is done, then after the clutch has been released during the movement of the controller from the contact $d$ to the contact $c$ and the motor is therefore disconnected from the load the engagement of the spring-contacts with the contact $c$ will connect the batteries in series with the motor and the speed of the latter will be very rapidly accelerated to bring the abutment to rest and finally to cause it to be locked by the low-speed dog 26 when it tends to turn backward. In some instances, in fact, the omission of the switch for breaking the armature-circuit or its use only to bridge the retarding contacts might be advantageously made, since it would enable the device to operate directly from low to high speed, and vice versa, without requiring the controller to be moved back to its starting position, as is necessary when the switch is employed to bridge not only the retarding contacts $l$, but also the low-speed contacts $a\ b\ c$. My purpose in illustrating this switch is to show a way by means of which the checking of the motor by the engagement of the contact-springs 88 with the contacts $l$ on the return movement of the controller, followed by a very rapid acceleration of the armature speed when the contacts $c$ are reached, may be prevented. Unless the motor were especially designed to meet the particular conditions its immediate connection in series with the battery after having been first checked in speed would be undesirable.

Having now described my invention, what I claim as new therein, and desire to secure by Letters Patent, is as follows:

1. The combination with a motor and a load operated thereby, of mechanical connections between the motor and load susceptible of a plurality of speed relations, means for disconnecting the motor from the load when a change to a higher or lower speed relation between the two is to be made and for permitting the motor and the load to acquire such higher or lower speed relation independently of each other while disconnected, and means for reconnecting the motor with the load without mechanical shock, substantially as set forth.

2. The combination with a motor and a load operated thereby, of mechanical connections between the motor and load susceptible of a plurality of speed relations, means for disconnecting the motor from the load when a change to a higher or lower speed relation between the two is to be made and for permitting the motor and the load to acquire such higher or lower speed relation independently of each other while disconnected, and means for reconnecting the motor with the load without mechanical shock simultaneously with the acquisition of the changed speed relation between the two, substantially as set forth.

3. The combination with a motor and a load operated thereby, of mechanical connections between the motor and the load susceptible of two speed relations, means for disconnecting the motor from the load when a change from one speed relation to the other is to be made and for permitting the motor to be accelerated or retarded in speed relatively to the load when the new speed relation between the two is reached, and means for reconnecting the motor to the load without shock to maintain the changed speed relation, substantially as set forth.

4. The combination with a motor and a load operated thereby, of mechanical connections between the motor and the load susceptible of two speed relations, means for disconnecting the motor from the load when a change from one speed relation to the other is to be made and for permitting the motor to be accelerated or retarded in speed relatively to the load when the new speed relation is reached, and means operating concurrently with the acquisition of the changed speed relation between the two for reconnecting the motor to the load without shock to maintain the changed speed relation, substantially as set forth.

5. The combination with a motor and a load operated thereby, of mechanical connections between the motor and the load susceptible of a plurality of speed relations between the two, means for retarding the speed of the motor when an increased speed relation between the motor and load is to be effected without effecting a similar retardation in the load, whereby the motor and load will acquire the desired change in the relation between the two, and means for connecting the motor and load in their new relation, without shock, substantially as set forth.

6. The combination with a motor and a load operated thereby, of mechanical connections between the motor and the load susceptible of a plurality of speed relations between the two, means for retarding the speed of the motor when an increased speed relation between the motor and load is to be effected without effecting a similar retardation in the load, whereby the motor and load will acquire the desired change in the relation between the two, and means for connecting the motor and load in their new relation concurrently with the acquisition of the changed speed relation between the motor and load, substantially as set forth.

7. The combination with a motor and a load operated thereby, of mechanical connections between the motor and load susceptible of a plurality of speed relations between the two, means for disconnecting the motor and load, permitting a retardation in the speed of the motor without effecting a corresponding retardation in the speed of the load when an increased speed relation between the motor and load is to be effected, whereby the motor and load will acquire an increased speed relation, and means for connecting the motor and load without shock to maintain the new speed relation between the two, substantially as set forth.

8. The combination with a motor and a load operated thereby, of mechanical connections between the motor and load susceptible of a plurality of speed relations between the two, means for disconnecting the motor and load, permitting a retardation in the speed of the motor without effecting a corresponding retardation in the speed of the load when an increased speed relation between the motor and load is to be effected, whereby the motor and load will acquire a reduced speed relation, and means for connecting the motor and load without shock to maintain the new speed relation between the two operating concurrently with the acquisition of such new speed relation, substantially as set forth.

9. The combination with a motor and a load driven thereby, of a rotatable abutment, gearing carried by said abutment and interposed between the motor and load, whereby when the abutment is stationary one speed relation between the motor and load is secured and when the abutment rotates a second speed relation between the two is secured, means for locking the abutment against backward movement and means for locking the abutment to the motor when the abutment and motor rotate in synchronism, substantially as set forth.

10. The combination with a motor and a load driven thereby, of a rotatable abutment, gearing carried by said abutment and interposed between the motor and load, whereby when the abutment is stationary one speed relation between the motor and load is secured and when the abutment rotates a second speed relation between the two is secured, means for locking said abutment against movement, means for unlocking said abutment, and means for locking the abutment to the motor when the abutment and motor rotate in synchronism, substantially as set forth.

11. The combination with a motor and a load driven thereby, of a rotatable abutment, gearing carried by said abutment and interposed between the motor and load, whereby when the abutment is stationary one speed relation between the motor and load is secured, and when the abutment rotates a second speed relation between the two is secured, a clutch for connecting the abutment with said motor, means for changing the speed relation between the motor and load to cause the motor to rotate in synchronism with the clutch, and means for operating said clutch to connect the abutment with the motor, substantially as set forth.

12. The combination with a motor and a load driven thereby, of a rotatable abutment, gearing carried by said abutment and interposed between the motor and load, whereby when the abutment is stationary one speed relation between the motor and load is secured, and when the abutment rotates a second speed relation between the two is secured, means for locking the abutment against backward movement, a clutch for connecting the abutment with said motor, means for changing the speed relation between the motor and load to cause the abutment to rotate in synchronism with the clutch, means for locking the clutch against movement into engaging position, means for unlocking the clutch when the abutment rotates in synchronism therewith, and means for operating the clutch when released to connect the abutment with the motor, substantially as set forth.

13. The combination with a driving-shaft and a driven shaft, of a rotatable abutment, gearing on said abutment between said shafts and transmitting power when the abutment is stationary, means for locking the abutment against backward movement means for releasing the abutment, and means for locking the abutment to one of said shafts when the abutment and said shaft rotate in synchronism, substantially as set forth.

14. The combination with a driving-shaft and a driven shaft, of a rotatable abutment, gearing on said abutment between said shafts and transmitting power when the abutment is stationary, means for locking the abutment against backward movement means for releasing the abutment, and a clutch for locking the abutment to one of said shafts when the abutment and clutch rotate in synchronism, substantially as set forth.

15. The combination with a driving-shaft and a driven shaft, of a rotatable abutment, gearing on said abutment between said shafts and transmitting power when the abutment is stationary, means for locking the abutment against backward movement means for releasing the abutment, a clutch for locking the abutment to one of said shafts, means for locking said clutch against movement into engaging position, and means for unlocking said clutch when the abutment tends to rotate faster than the same, substantially as set forth.

16. The combination with a driving-shaft and a driven shaft, of a rotatable abutment, gearing on said abutment between said shafts and transmitting power when the abutment is stationary, means for locking the abutment against backward movement means for releasing the abutment, a clutch for locking the abutment to one of said shafts, a lock for locking said clutch against movement into engaging position, and a pawl on the abutment for releasing said lock when the abutment tends to rotate faster than the clutch, substantially as set forth.

17. The combination with a driving-shaft and a driven shaft, of gearing between said shafts for driving the driven shaft at a different speed from the driving-shaft, means for disconnecting the shafts, means for changing the speed relation of said shafts, whereby the shafts will turn at the same speed, and means for connecting the shafts together without shock when turning at the same speed, substantially as set forth.

18. The combination with a driving-shaft and a driven shaft, of gearing between the shafts for driving the driven shaft at a different speed from the driving-shaft, a clutch for locking the shafts together, means for disconnecting the shafts, whereby the shafts will be permitted to turn independently, and means for actuating said clutch to lock the shafts together when the shafts rotate in synchronism, substantially as set forth.

19. The combination with a driving-shaft and a driven shaft, of gearing between the shafts for driving the driven shaft at a different speed from the driving-shaft, a clutch for connecting the driving-shaft to the driven shaft, a lock for locking said clutch against movement to connect the shafts together, means for disconnecting the shafts, whereby the shafts may rotate independently, means for actuating the lock to release the clutch when the shafts rotate synchronously, and means for actuating the clutch when released to lock the two shafts together, substantially as set forth.

20. In a variable-speed gearing, the combination with a tubular shaft and a shaft mounted therein, of an abutment mounted concentrically to said shafts, gearing carried by the abutment interposed between said shafts, a clutch carried by one shaft for locking the abutment thereto, and a lock for said clutch actuated by the movements of said abutment, substantially as set forth.

21. In a variable-speed gearing, the combination with a tubular shaft and a shaft mounted therein, of an abutment mounted concentrically to said shafts, gearing carried by the abutment interposed between said shafts, a clutch carried by one shaft for locking the abutment thereto, and a movable locking-ring for locking said clutch, said ring being actuated by the movements of the abutment, substantially as set forth.

22. In a variable-speed gearing, the combination with a tubular shaft and a shaft mounted therein, of an abutment mounted concentrically to said shafts, gearing carried by the abutment interposed between said shafts, a clutch carried by one shaft for locking the abutment thereto, a movable locking-ring for locking said clutch, and a pawl carried by the abutment for moving said ring to unlock the clutch, substantially as set forth.

23. In a variable-speed gearing, the combination with a tubular shaft and a shaft mounted therein, of an abutment mounted concentrically to said shafts, gearing carried by the abutment interposed between said shafts, a clutch carried by one shaft for locking the abutment thereto, a movable locking-ring for locking said clutch, a pawl carried by the abutment for moving said ring to unlock the clutch, and means for withdrawing the pawl from the locking-ring on the disengaging movement of the clutch, substantially as set forth.

24. In a variable-speed gearing, the combination with a tubular shaft and a shaft mounted therein, of an abutment mounted concentrically to said shafts, gearing carried by the abutment interposed between said shafts, a clutch carried by one shaft for locking the abutment thereto, a movable locking-ring for locking said clutch, a pawl carried by the abutment for moving said ring to unlock the clutch, and means for withdrawing the pawl from the locking-ring at both ends of the movement of the clutch, substantially as set forth.

25. In a variable-speed gearing, the combination with a tubular shaft and a shaft mounted therein, of an abutment mounted concentrically to said shafts, gearing carried by the abutment interposed between said shafts, a clutch carried by one shaft for locking the abutment thereto, a movable locking-ring for locking said clutch, and a pawl carried by the abutment for moving said ring to unlock the clutch, the clutch being provided with a shoulder for withdrawing said pawl from the locking-ring on the disengaging movement of the clutch, substantially as set forth.

26. In a variable-speed gearing, the combination with a tubular shaft and a shaft mounted therein, of an abutment mounted concentrically to said shafts, gearing carried by the abutment interposed between said shafts, a clutch carried by one shaft for locking the abutment thereto, a movable locking-ring for locking said clutch, a pawl carried by the abutment for moving said ring to unlock the clutch, the clutch being provided with a shoulder for withdrawing said pawl from the locking-ring on the disengaging movement of the clutch, and a cam on said clutch for withdrawing the pawl from the locking-ring on the engaging movement of the clutch, substantially as set forth.

27. In a variable-speed gearing, the combination with two shafts, of an abutment mounted thereon, gearing between the shafts carried by said abutment, a clutch for locking one of said shafts to the abutment, a cam-shaft, a cam on said cam-shaft, and connections from said cam for actuating the clutch, substantially as set forth.

28. In a variable-speed gearing, the combination with two concentrically-arranged shafts, of an abutment mounted concentrically to said shafts, gearing between the shafts carried by said abutment, a clutch for locking one of said shafts to the abutment, a cam-shaft, a cam on said cam-shaft, and connections from said cam for actuating the clutch, substantially as set forth.

29. In a variable-speed gearing, the combination with two concentrically-arranged shafts, of an abutment mounted concentrically to said shafts, a clutch for locking one of said shafts to the abutment, a lock for said clutch, and means operated by the abutment for releasing said lock, substantially as set forth.

30. In a variable-speed gearing, the combination with two concentrically-arranged shafts, of an abutment mounted concentrically to said shafts, gearing carried by the abutment and connecting the shafts, a clutch for locking one of the shafts to the abutment, a locking-ring for locking said clutch normally from engaging movement and means operated by the abutment for moving said ring to unlock the clutch, substantially as set forth.

31. In a variable-speed gearing, the combination with two concentrically-arranged shafts, of an abutment mounted concentrically to said shafts gearing carried by the abutment and connecting the shafts, a clutch for locking one of the shafts to the abutment, a locking-ring for locking said clutch normally from engaging movement, and a pawl carried by the abutment for engaging said locking-ring to move it for unlocking the clutch, substantially as set forth.

32. In a variable-speed gearing, the combination with two concentrically-arranged shafts, of an abutment mounted concentrically to said shafts, gearing carried by the abutment and connecting the shafts, a clutch for locking one of the shafts to the abutment, a locking-ring for locking said clutch normally from engaging movement, a pawl carried by the abutment for engaging said locking-ring to move it for unlocking the clutch, and means controlled by the clutch for withdrawing said pawl from the locking-ring on the disengaged movement of the clutch, substantially as set forth.

33. In a variable-speed gearing, the combination with two concentrically-arranged shafts, of an abutment concentrically mounted with respect to said shafts, gearing between the shafts carried by said abutment, means for locking the abutment normally against movement, a cam-shaft for releasing the abutment, and means for locking one of said shafts to the abutment after the latter is released, substantially as set forth.

34. In a variable-speed gearing, the combination with two concentrically-arranged shafts, of an abutment concentrically mounted with respect to said shafts, gearing between the shafts carried by said abutment, means for locking the abutment normally against movement, a cam-shaft for releasing the abutment, and means for locking one of said shafts to the abutment after the abutment has been released and when it rotates in synchronism with the shaft to which it is locked, substantially as set forth.

35. In a variable-speed gearing, the combination with two concentrically-mounted shafts, of an abutment mounted concentrically with respect to said shafts, gearing between the shafts carried by said abutment, means for locking the abutment against backward movement, and means for locking the abutment to one of said shafts when the abutment rotates in a forward direction in synchronism with said shaft, substantially as set forth.

36. In a variable-speed gearing, the combination with two concentrically-mounted shafts, of an abutment mounted concentrically with respect to said shafts, gearing between the shafts carried by said abutment, a locking-dog for locking the abutment normally stationary, a cam for releasing said dog, and means for locking the abutment to one of said shafts after the abutment has been released, substantially as set forth.

37. In a variable-speed gearing, the combination with a pair of concentrically-mounted shafts, of an abutment mounted concentrically with respect to said shafts, gearing between the shafts carried by said abutment, a locking-dog for locking said abutment normally stationary, a clutch for locking the abutment to one of said shafts, and a cam-shaft having cams for releasing said dog and for subsequently operating said clutch, substantially as set forth.

38. In a variable-speed gearing, the combination with a pair of concentrically-mounted shafts, of an abutment mounted concentrically with respect to said shafts, gearing between the shafts carried by said abutment, a locking-dog for locking said abutment normally stationary, a clutch for locking the abutment to one of said shafts, a cam-shaft having cams for releasing said dog and for subsequently operating said clutch, and a lock for locking the clutch from engagement with said abutment until the abutment turns in synchronism with the shaft to which it is to be locked, substantially as set forth.

39. In a variable-speed gearing, the combination with a pair of concentrically-mounted shafts, of an abutment mounted concentrically with respect to the shafts, gearing between the shafts carried by said abutment, a locking-dog for permitting rotation of the abutment in one direction but resisting rotation thereof in the other direction, and means for locking the abutment to one of said shafts, substantially as set forth.

40. In a variable-speed gearing, the combination with a pair of concentrically-mounted shafts, of an abutment mounted concentrically with respect to the shafts, gearing between the shafts carried by said abutment, a locking-dog permitting rotation of the abutment in one direction but resisting rotation thereof in the other direction, a cam for withdrawing said dog from the abutment, and means for locking the abutment to one of said shafts, substantially as set forth.

41. In a variable-speed gearing, the combination with a pair of concentrically-mounted shafts, of an abutment mounted concentrically with respect to said shafts, gearing between the shafts carried by said abutment, a pair of locking-dogs alternately engaging the abutment, means for engaging said dogs alternately with the abutment, and means for locking the abutment to one of said shafts, substantially as set forth.

42. In a variable-speed gearing, the combination with a pair of concentrically-mounted shafts, of an abutment mounted concentrically to said shafts, gearing between the shafts carried by said abutment, means for locking the abutment against backward movement, a clutch for locking one of said shafts to the abutment, a cam for actuating said clutch, and a star-wheel movable with said cam for determining the positions thereof, substantially as set forth.

43. In a variable-speed gearing, the combination with a pair of concentrically-mounted shafts, of an abutment mounted concentrically to said shafts, gearing between the shafts carried by said abutment, means for locking the abutment against backward movement, a clutch for locking one of said shafts to the abutment, a cam for actuating said clutch, a star-wheel movable with said cam for determining the positions thereof, and a lock for the clutch resisting movement thereof into engaging position but released by the movements of said abutment, substantially as set forth.

44. In a variable-speed gearing, the combination with a pair of concentrically-mounted shafts, an abutment formed of a pair of disks mounted on said shafts, gears between the shafts carried between said abutment-disks, means for locking the abutment against backward movement, and means for locking the abutment to one of said shafts when the two shafts turn in unison, substantially as set forth.

45. In a variable-speed gearing, the combination with a pair of concentrically-mounted shafts, an abutment formed of a pair of interlocked disks mounted on said shafts, gears between the shafts carried between said abutment-disks, means for locking the abutment against backward movement, and means for locking the abutment to one of said shafts when the two shafts turn in unison, substantially as set forth.

This specification signed and witnessed this 19th day of February, 1902.

FRANK L. DYER.

Witnesses:
    JNO. ROBT. TAYLOR,
    JOHN LOUIS LOTSCH.